US008672157B2

(12) United States Patent
Fontana (10) Patent No.: US 8,672,157 B2
(45) Date of Patent: Mar. 18, 2014

(54) PROCEDURE FOR MANUFACTURING BOTTLES CONTAINING FLUIDS, PARTICULARLY COSMETIC, MEDICAL, PHARMACEUTICAL PRODUCTS OR THE LIKE, AND RELATIVE SYSTEM AND BOTTLES (75) Inventor: Antonio Fontana, Modena (IT)

(73) Assignee: Lameplast S.p.A., Franzione Rovereto Sul, Secchia (IT)

( * ) Notice: Subject to any disclaimer, the term of this patent is extended or adjusted under 35 U.S.C. 154(b) by 715 days.

(21) Appl. No.: 12/450,352

(22) PCT Filed: Mar. 18, 2008

(86) PCT No.: PCT/IB2008/000647
§ 371 (c)(1),
(2), (4) Date: Oct. 15, 2009

(87) PCT Pub. No.: WO2008/117149
PCT Pub. Date: Oct. 2, 2008

(65) Prior Publication Data
US 2010/0032401 A1 Feb. 11, 2010

(30) Foreign Application Priority Data
Mar. 23, 2007 (IT) .............................. MO2007A0104

(51) Int. Cl.
B65D 45/32 (2006.01)
(52) U.S. Cl.
USPC ................................ 215/291; 215/325; 215/48
(58) Field of Classification Search
USPC ............. 215/291, 325, 249, 48, 43, 355, 250; 220/23.4; 206/524.1
See application file for complete search history.

(56) References Cited

U.S. PATENT DOCUMENTS

| 2,044,837 A | * | 6/1936 | Davis | 220/315 |
| 2,778,533 A | | 1/1957 | Savary | |
| 3,369,720 A | * | 2/1968 | Libit et al. | 222/517 |
| 4,512,475 A | | 4/1985 | Federighi | |
| 6,234,333 B1 | | 5/2001 | Federighi | |
| 6,290,094 B1 | | 9/2001 | Arnold et al. | |
| 6,510,971 B1 | | 1/2003 | Martin | |
| 6,874,665 B2 | * | 4/2005 | Doherty et al. | 222/541.5 |

FOREIGN PATENT DOCUMENTS

| GB | 2 041 891 | 9/1980 |
| IT | 199 776 | 5/1986 |
| WO | WO 97/49611 | 12/1997 |
| WO | WO 98/01348 | 1/1998 |

OTHER PUBLICATIONS

International Search Report.

* cited by examiner

Primary Examiner — Jeffrey Allen
(74) Attorney, Agent, or Firm — Young & Thompson (57) ABSTRACT The procedure for manufacturing bottles (2) containing fluids, particularly—cosmetic, medical, pharmaceutical products or the like, comprises a forming phase of a hollow body (4) having a dispensing mouth (5) that can be closed by means of removable closing means (8) comprising shutter means (10) that can be coupled with the mouth, the closing means being made in a single body with the hollow body. During the forming phase, the closing means are arranged with the shutter means substantially transversal to the direction of coupling with the dispensing mouth. After the forming phase a coupling" phase is contemplated of the shutter means with the dispensing mouth.

12 Claims, 7 Drawing Sheets

PROCEDURE FOR MANUFACTURING BOTTLES CONTAINING FLUIDS, PARTICULARLY COSMETIC, MEDICAL, PHARMACEUTICAL PRODUCTS OR THE LIKE, AND RELATIVE SYSTEM AND BOTTLES

CROSS REFERENCE TO RELATED APPLICATIONS

This application is the National Stage of PCT/IB2008/000647 filed on Mar. 18, 2008, which claims priority under 35 U.S.C. §119 of Italian Application No. MO2007A000104 filed on Mar. 23, 2007. The international application under PCT article 21(2) was published in English.

TECHNICAL FIELD

This invention relates to a procedure for manufacturing bottles containing fluids, particularly cosmetic, medical, pharmaceutical products or the like, and relative system.

BACKGROUND ART

Re-closable plastic containers are known for pharmaceutical, cosmetic or other products, which are made by blowing and/or moulding, in two parts, one of which is composed of the container body, while the other part is composed of closing means, to keep the container closed after its manufacture and to close it again after use.

In these containers, the closing means remain fitted in the neck of the container, or coupled with this, until this is opened for the first time to be used.

Consequently, the part of the closing means in contact with the container neck is protected against external polluting agents, which cannot deposit on this and, therefore, the risk of said polluting agents being accidentally introduced inside the container when this is closed again after a first use with the same closing means is extremely limited.

The above containers are nevertheless costly to make as they require separate moulds for the two parts of the container, which also have to be assembled after moulding.

Re-closable plastic containers are also known, for pharmaceutical, cosmetic or other products, which are made by blowing and/or moulding in a single piece, in which i.e., the container body is made in a single piece with the closing means suitable for keeping the container closed after its manufacture and/or for closing this after use.

A container of this type is the subject of the Italian utility model patent Nr. 199.776, which describes a single-dose or multi-dose container for pharmaceutical products comprising a body having a lower opening sealable by sealing and an upper neck, closed on top by closing means in the form of a peduncle, obtained all one piece with it and with a cap having shutter means to close the container neck again after this has been opened by tearing the peduncle, the shutter means being obtained on the part of the cap turned in the opposite direction with respect to the container neck.

These containers are undoubtedly cheaper to make than the previous ones, but have the drawback that the closing means have to be obtained on the outside of the container during moulding.

The part of the closing means that has to be used to close the container again after use, in point of fact remains exposed to external polluting agents which can thus easily enter the inside of the container when this is closed again after a first use.

This circumstance is considerably hazardous, especially in the case of the containers being used to contain pharmaceutical substances.

A further type of re-closable containers made in a single piece is the subject of the industrial invention patent nr. 1.287.450 and consists of a hollow body, having a dispensing mouth, and of a closing cap that has a shutter pin obtained on the part turned towards the mouth.

During moulding, in point of fact, the hollow body and the cap are made slightly distanced the one from the other, with the shutter pin aligned and facing the dispensing mouth, but not in contact with this.

Furthermore, the hollow body and the cap are connected together by means of a pair of thin straps which, after moulding, allow these to be moved closer or away from each other to allow the coupling/uncoupling of the shutter means with/from the dispensing mouth.

This latter type of containers also has several drawbacks however, including the fact that they require particularly complex moulds, that are difficult to make, and do not permit obtaining high-quality containers.

In this respect, it should be considered that the traditional moulds usually consist of a pair of half-shells inside which a core can be fitted for forming the inner surface of the hollow body.

At the shutter pin, the bringing together of the two half-shells determines the formation of a thin line of burr.

Such line of burr extends along the entire length of the pin and is such as to prevent the sealed coupling of the shutter pin with the mouth of the container in closing configuration.

There is therefore a very high risk of negatively affecting the sterility of the product inside the container.

OBJECT OF THE INVENTION

Such previous state of the art is liable to considerable upgrading as regards the possibility of eliminating the drawbacks indicated above.

From what has been said above, in fact, the need arises to solve the technical problem of providing a procedure and a system for manufacturing bottles containing fluids, particularly cosmetic, medical, pharmaceutical products or the like, that permit making, in a practical, easy and inexpensive way, bottles which, after being opened, can be closed again so as to reduce to the utmost the risk of polluting the substance they contain.

Another object of the present invention is to find a procedure and a system for manufacturing bottles containing fluids, particularly cosmetic, medical, pharmaceutical products or the like, that permit overcoming the above-mentioned drawbacks of the state of the art within the framework of a simple, rational, easy and effective-to-use and inexpensive solution.

The above objects are achieved by the procedure for manufacturing bottles containing fluids, particularly cosmetic, medical, pharmaceutical products or the like, comprising the following steps:

forming at least a hollow body having at least a dispensing mouth that can be closed by means of removable closing means comprising shutter means that can be coupled with said mouth, said closing means being made in a single body with said hollow body;

coupling said shutter means with said mouth;

characterized by the fact that, during said forming, said closing means are arranged with said shutter means substantially transversal to the direction of coupling with said mouth.

The above-mentioned objects are also achieved by the present system for manufacturing bottles containing fluids, particularly cosmetic, medical, pharmaceutical products or the like, comprising at least a forming station for forming at least a bottle having at least a hollow body, at least a dispensing mouth obtained on said hollow body, removable closing means for closing said mouth comprising shutter means that can be coupled with the mouth, and connection means placed in between said closing means and said hollow body and suitable for leaving reciprocal movement between said closing means and said hollow body, said forming station comprising at least an outer mould hollow inside and at least an inner core that can be fitted in said mould to define, between the mould and the core, an inter-space for the formation in single body of said bottle, characterized by the fact that, during forming inside said inter-space, said closing means are arranged with said shutter means substantially transversal to the direction of coupling with said mouth.

BRIEF DESCRIPTION OF THE DRAWINGS

Further characteristics and advantages of the present invention will appear more evident from the description of a preferred, but not only embodiment of a system for manufacturing bottles containing fluids, particularly cosmetic, medical, pharmaceutical products or the like, illustrated indicatively by way of non limiting example, in the attached drawings wherein.

EMBODIMENTS OF THE INVENTION

With particular reference to such figures, by 1 is generally indicated a system for manufacturing bottles containing fluids, particularly cosmetic, medical, pharmaceutical products or the like.

With particular reference to such embodiment of the invention shown in the illustrations, the bottles 2 obtained by means of the system 1 are made in series to form strips of five pieces each, joined together along weakened temporary connection segments 3.

Different embodiments of the invention cannot however be ruled out in which the bottles 2 are made individually, or in strips with quantities of bottles 2 different to those shown in the illustrations.

Each bottle 2 comprises a hollow body 4 made of plastic intended for the future containing of the fluid product.

At one end, the hollow body 4 has a mouth 5 for dispensing the fluid product.

In particular, the hollow body 4 has a substantially tubular and elongated shape, and the above end of the hollow body 4 extends into a neck 6, at the top of which the mouth 5 is defined.

At the end of the hollow body 4 opposite the neck 6 an opening 7 is defined for introducing the product; the closing of the opening 7 (e.g., by sealing the lips of the opening itself) is done once the product has been introduced inside.

Furthermore, each bottle 2 comprises closing means 8 for closing the mouth 5, of the removable type and which can be associated with the hollow body 4 at the neck 6.

In detail, the closing means 8 consist of a grip 9 supporting shutter means 10 engageable at the mouth 5.

In the particular embodiment of the invention shown in the illustrations, the grip 9 is substantially defined plate-shaped and the shutter means 10 are composed of a small pin that can be fitted sealed inside the mouth 5.

The operating surface of the small pin 10, meaning by operating surface that intended to come into contact with the mouth 5 to ensure its seal, consists in practice of a cylindrical surface complementary to that of the inner surface of the mouth 5.

Alternative manufacturing solutions are however possible where the grip 9 and the small pin 10 have different shapes.

Between the grip 9 and the neck 6 connection means 11 are placed suitable for leaving reciprocal movement between the closing means 8 and the hollow body 4.

The connection means 11, in particular, are composed of two straps of elongated shape, that extend from the hollow body 4 to the closing means 8 and are arranged from parts diametrically opposite the neck 6.

Figure 1:
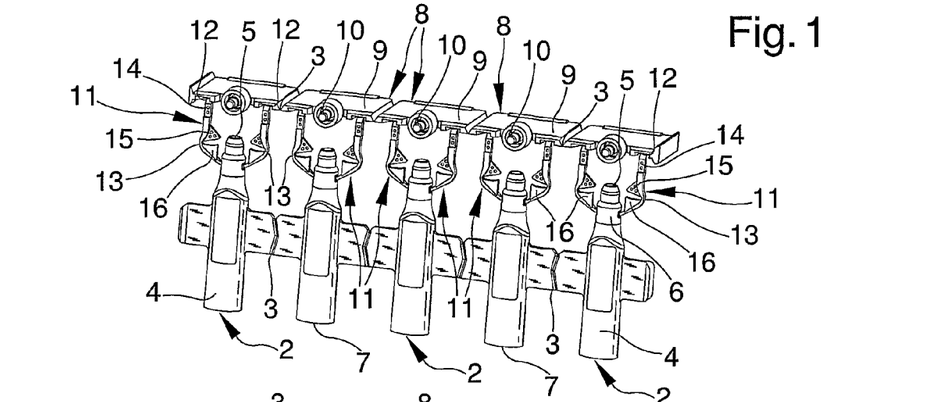
FIG. 1 is an axonometric view of a strip of bottles obtained with the system according to the invention, arranged in the first operating configuration.
Figure 2:
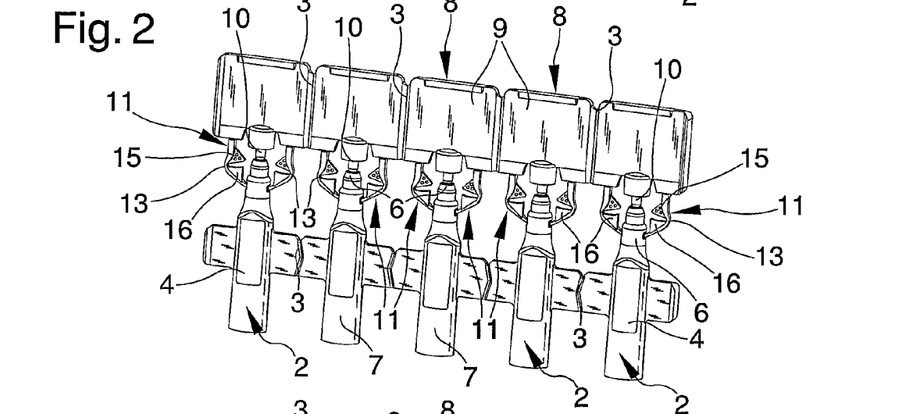
FIG. 2 is an axonometric view of the strip of FIG. 1 with the bottles arranged in the second operating configuration.

Each strap 11 has a first segment 12 with weakened section, which is obtained at the point of joining to the grip 9 and is suitable for allowing the rotation of the closing means 8 between a first operating configuration, in which the small pin 10 is arranged substantially at right angles to the direction of coupling to the mouth 5 (FIG. 1), and a second operating configuration, in which the shutter means 10 are turned towards and aligned with the mouth 5 (FIG. 2).

Figure 3:
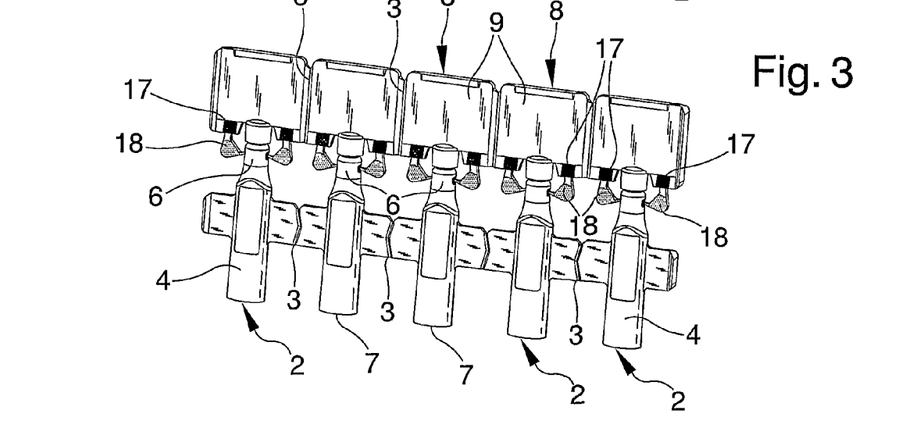
FIG. 3 is an axonometric view of the strip of FIG. 1 with the bottles arranged in the closing configuration of the dispensing mouths.

Furthermore, the straps 11 have a second segment 13 with weakened section, which is obtained in substantially median position with respect to the entire length of the straps 11 and which is suitable for allowing the bending of the straps themselves between the second operating configuration and the closing configuration of the mouth 5 (FIG. 3).

In detail, the straps 11 have a first portion 14, that extends between the first segment 12 and the second segment 13 and which can be superimposed on the grip 9 during switch from the first to the second operating configuration.

Furthermore, astride the second segments 13, the straps 11 have a second portion 15 and a third portion 16 which are superimposable during switch from the second operating configuration to the closing configuration of the mouth 5.

The bottle 2 comprises locking means for locking the straps 11 in the closing configuration of the mouth 5.

Such locking means consist, e.g., of a first sealing point 17 of the first portions 14 with the grip 9 superimposed the one on the other, and of a second sealing point 18 of the second and the third portions 15 and 16 superimposed the one on the other.

The fitting of the locking means 17 and 18 does in fact strengthen the straps 11 and makes them suitable to act as a seal of guarantee, because they do not allow their elastic deformation and do not allow the bottle 2 to be opened without their being broken.

Figure 4:
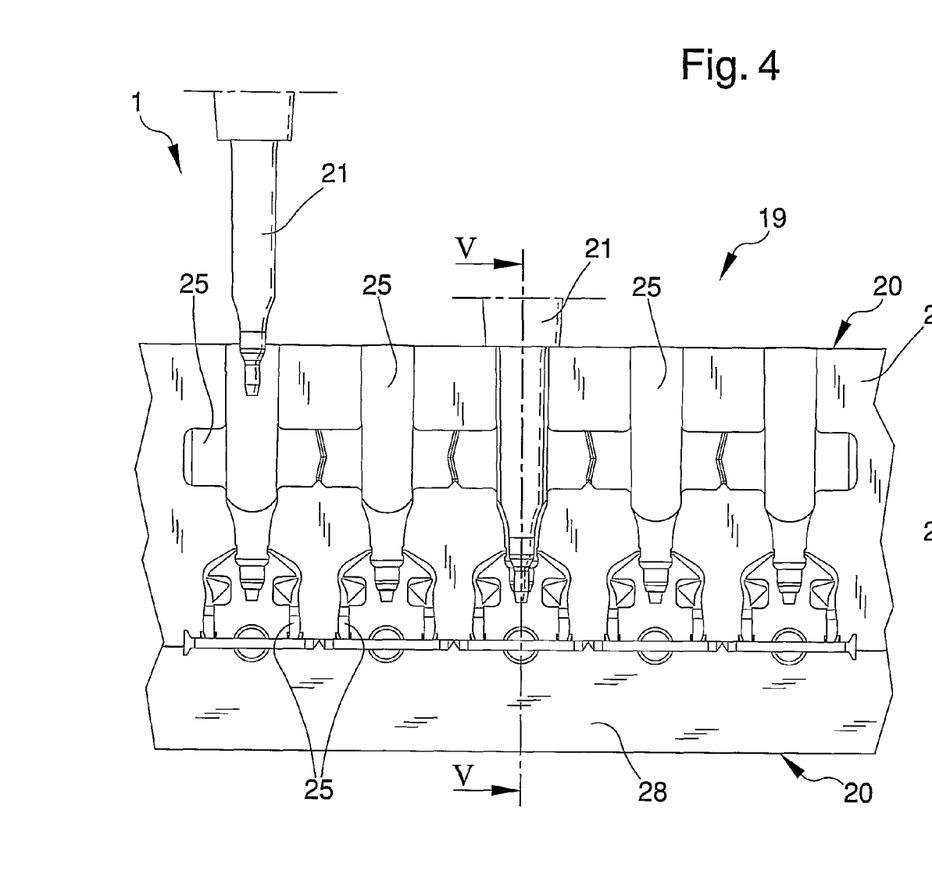
FIG. 4 is a front, schematic and partial view of the forming station contemplated by the system according to the invention.
Figure 5:
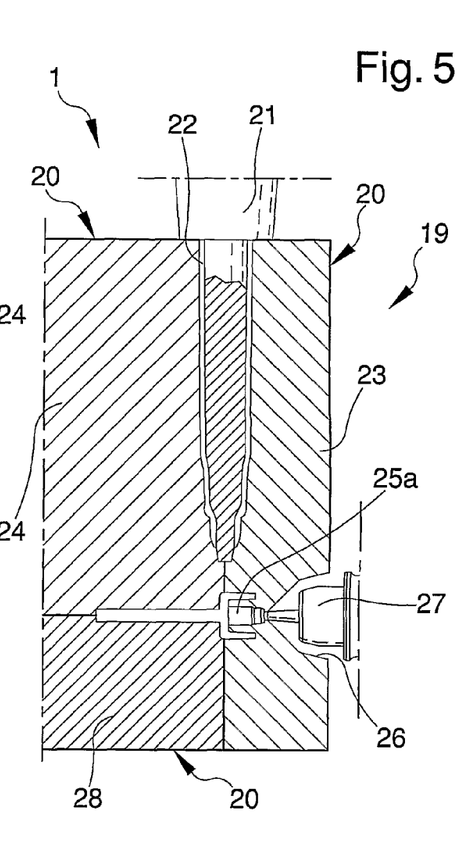
FIG. 5 is a section view along the V-V plane of FIG. 4.

For the manufacture of the bottles 2, the system 1 contemplates a forming station 19 for the formation of the strips of bottles 2 (FIGS. 4 and 5).

The forming station 19 has an outer mould 20, hollow inside, and a plurality of inner cores 21 that can be fitted in the outer mould 20 so as to define between the mould 20 and the cores 21 an inter-space 22 for the formation in a single body of the strip of bottles 2.

The outer mould 20 and the inner cores 21 are shaped so that, during forming inside the inter-space 22, the closing means 8 of the bottles 2 are arranged with the shutter means 10 substantially transversal, in particular at right angles, to the direction of coupling to the mouth 5.

In detail, the outer mould 20 comprises a first shaped shell 23 and a second shaped shell 24, separable from each other and having cavities 25 that can be reciprocally coupled together to form corresponding portions of the surface of the bottles 2.

Advantageously, the cavity 25a intended for forming the operating surface of the small pin 10 are entirely obtained in just one of the shaped shells, and in particular in the first shaped shell 23.

At the above cavity 25a, furthermore, the first shaped shell 23 has a gap 26 suitable for introducing a dispenser nozzle 27 which permits injecting plastic material under pressure in fluid state inside the inter-space 22.

The outer mould 20, furthermore, comprises a third shaped shell 28, suitable for cooperating with the first and the second shaped shells 23 and 24 for forming the grip 9 of the closing means 8.

Different embodiments of the outer mould 20 cannot however be ruled out in which, e.g. the third shaped shell 28 is obtained integral with the second shaped shell 24.

Coming out of the forming station 19, in point of fact, the bottles 2 are arranged in the first operating configuration.

Figure 6:
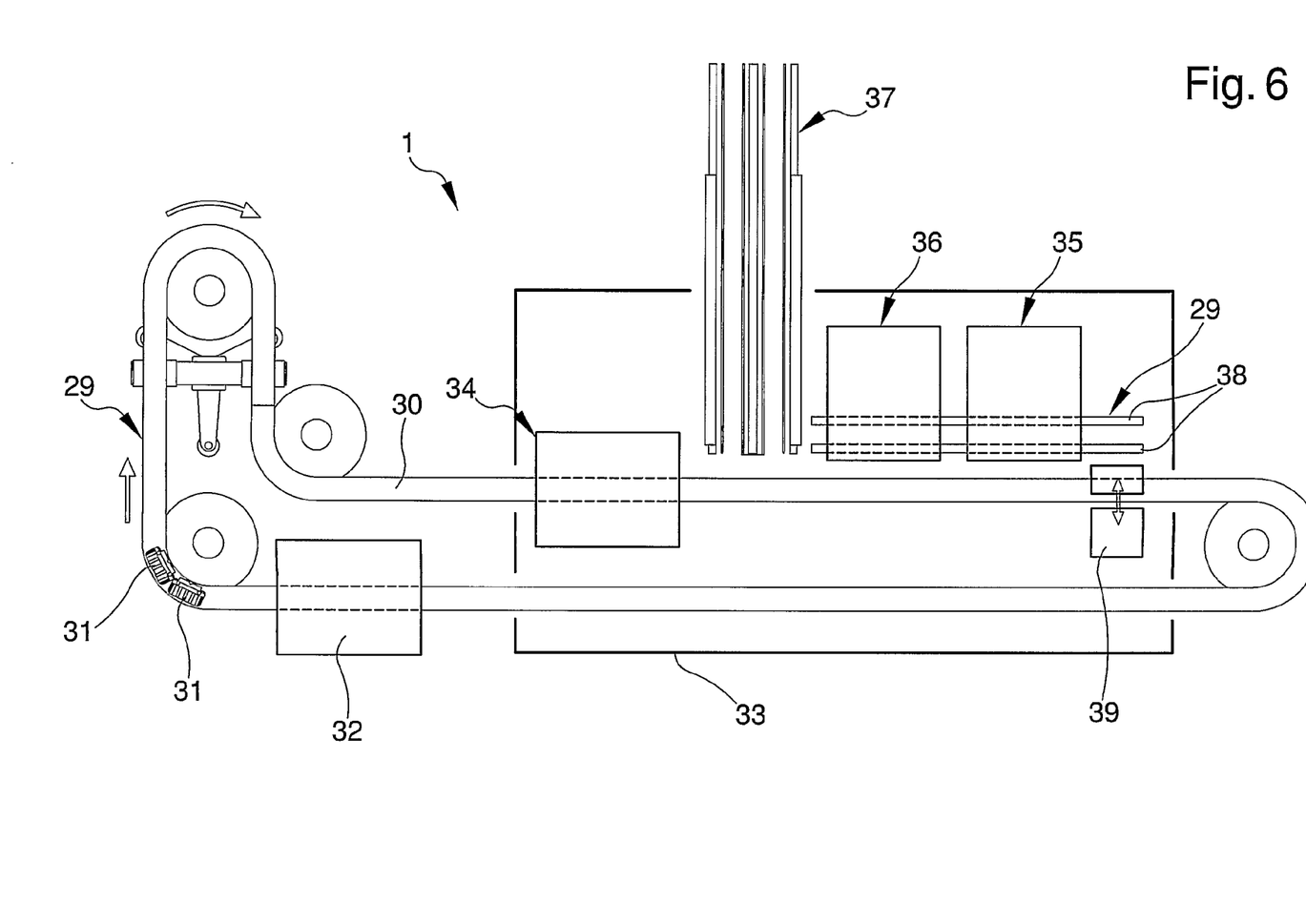
FIG. 6 is a plan, schematic and partial view that shows the forward moving line contemplated by the system according to the invention for making the processing phases after forming.

For the working phases of the bottles 2 subsequent to forming, the system 1 has a forward moving line 29 of the bottles 2 located downstream of the forming station 19 (FIG. 6).

Such forward moving line comprises a guide rail 30 that is engaged sliding by a plurality of slides 31 which support the bottles 2.

In the particular embodiment shown in FIG. 6, each slide 31 is sized to carry a single strip of bottles 2, but it is easy to appreciate how these can usefully have different shapes and dimensions according to the type of bottles 2 and/or of strips of bottles 2 to be conveyed.

The guide rail 30 extends from a loading station 32, where the bottles 2 just formed are collected and arranged above the slides 31, as far as a working cabin 33, containing the remaining stations (34, 35, 36 and 37) for working the bottles 2.

Inside the working cabin 33, the forward moving line 29 branches out.

This does in fact have an auxiliary segment 38 for moving the bottles 2, which is arranged parallel with the guide rail 30, and conveyor means 39, of the shuttle type or the like, that allow moving the bottles 2 from the guide rail 30 to the auxiliary segment 38.

Inside the working cabin 33, a coupling station 34 is located suitable for coupling the closing means 8 to the mouths 5 of the bottles 2.

Such coupling station comprises: a base frame 40 arranged along the guide rail 30; first grip means 41 of the hollow bodies 4 of the bottles 2; second grip means 42 of the grips 9 of the bottles 2; rotation means 43 for placing in relative rotation the first grip means 41 and the second grip means 42 around a work axis A substantially at right angles to the small pins 10 of the bottles 2, suitable for rotating the first grip means 41 with respect to the second grip means 42 until the small pins 10 of the bottles 2 are aligned with the mouths 5 of the bottles themselves; relative bringing closer means 44 of the closing means 8 and of the hollow bodies 4 of the bottles 2 until the small pins 10 are associated with the mouths 5.

The first grip means 41, in detail, consist of a first vice defined by a stop element 45, associated integral with the base frame 40 above the guide rail 30, and by a lifting element 46 for lifting the slides 31.

The lifting element 46, in point of fact, is suitable for vertically moving the slide 31 that transits in the coupling station 34 and firmly positioning the hollow bodies 4 of the bottles 2 between the stop element 45 and the above slide 31.

The second grip means 42 consist of a second vice associated with the base frame 40 by interposition of the rotation means 43 and of the relative bringing closer means 44.

The rotation means 43, in particular, are composed of a bracket, of the type of a plate or the like, which is fitted on the base frame 40 in a way turnable around the work axis A and which supports the second grip means 42 and the relative bringing closer means 44.

The start of rotation of the bracket 43 is triggered by means of a first linear actuator 47, of the type of a pneumatic jack, the liner of which is hinged to the base frame 40 and the stem of which is hinged to the bracket 43.

The relative bringing closer means 44 are defined by a support body which supports the second grip means 42 and which is fitted on the bracket 43 in a way sliding along a direction substantially at right angles to the work axis A.

The movement of the support body 44 is triggered by means of a second linear actuator 48, of the type of a pneumatic jack, the liner of which is fitted integral on the bracket 43 and the stem of which drives the support body 44.

The second grip means 42 consist of a first jaw 49, associated integral with the support body 44 and of a second jaw 50 associated with the support body 44 in a way sliding along a closing and opening direction of the vice.

The movement of the second jaw 50 with respect to the first jaw 49 is triggered by means of a third linear actuator 51, of the type of a pneumatic jack, the liner of which is integral with the support body 44 and the stem of which drives the second jaw 50.

Figure 7:
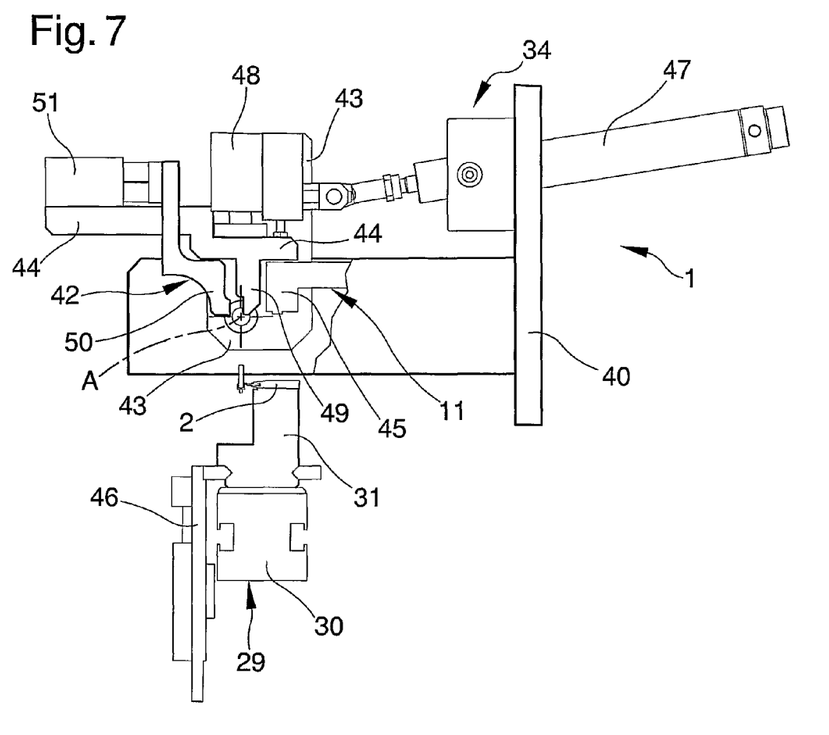
FIGS. 7 to 11 show, in a sequence of side raised views, the operation of the coupling station contemplated by the system according to the invention.
Figure 8:
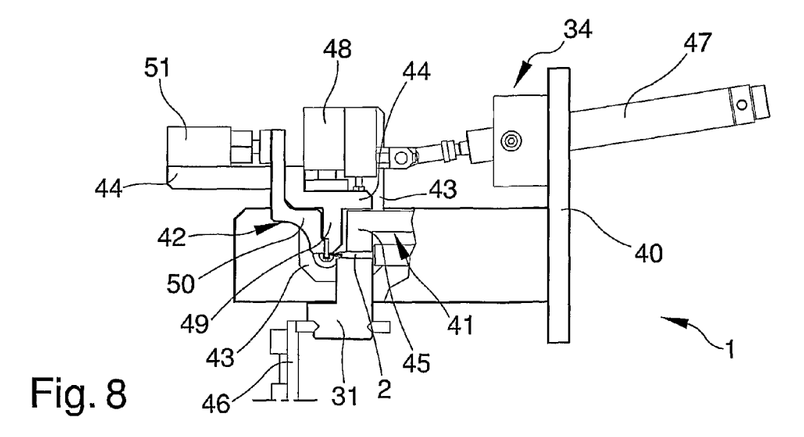

In point of fact, the bottles 2, which are still arranged in the first operating configuration, reach the coupling station 34 along the guide rail 30 (FIG. 7) and are lifted with respect to the forward moving line 29 until the hollow bodies 4 are trapped in the first vice 41 and the closing means 8 are placed between the open jaws 49 and 50 of the second vice 42, which promptly close (FIG. 8).

Figures 9, 10:
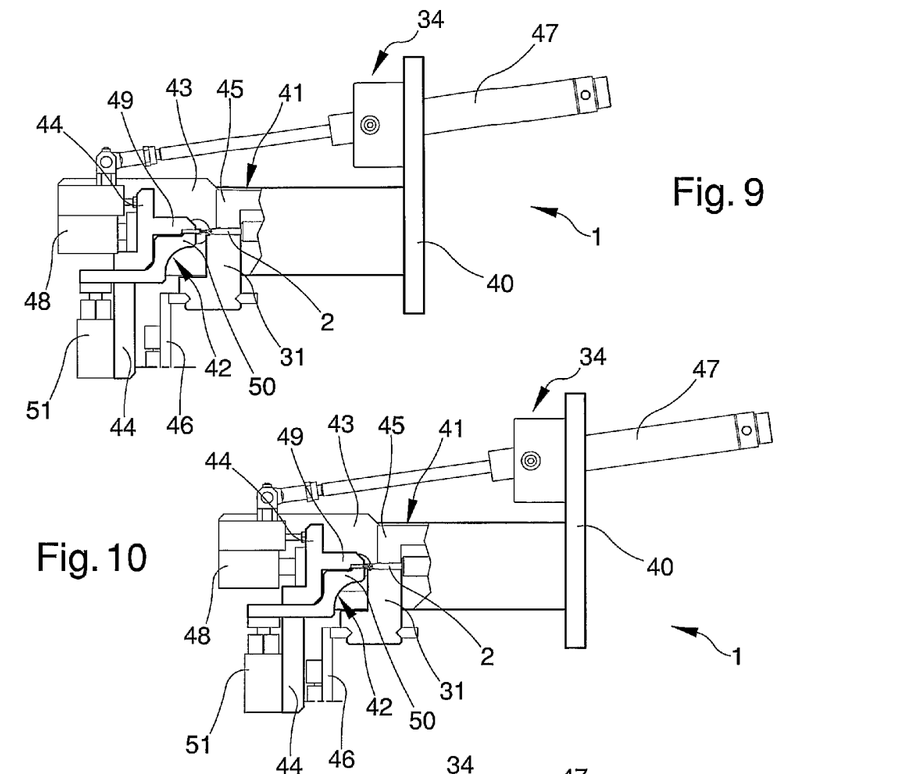

Starting from this position, the starting in series of the first linear actuator 47 and of the second linear actuator 48 initially allows positioning the bottles 2 in the second operating configuration (FIG. 9) and, therefore, placing them in the closing configuration of the mouths 5 (FIG. 10).

Figure 11:
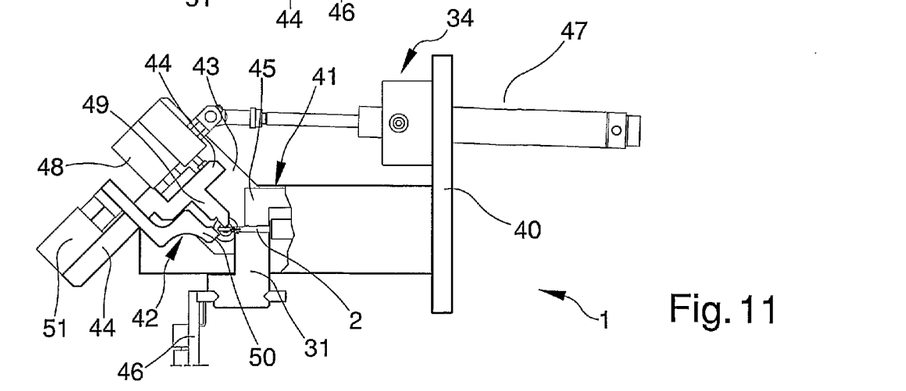

Afterwards, by means of the opening of the second vice 42, the moving away of the support body 44 from the bottles 2 and the rotation of the bracket 43 (FIG. 11), the bottles 2 can be returned to the guide rail 30 to continue their travel along the forward moving line 29 and reach a blockage station 35 of the straps 11 of the bottles 2 in the closing configuration of the mouths 5.

Such blockage station is arranged along the auxiliary segment 38 of the forward moving line 29 and has a base 52 that supports a sealing apparatus 53, suitable for sealing the straps 11, and movement means 54 for moving the bottles 2, suitable for transferring the bottles 2 from the auxiliary segment 38 to the sealing apparatus 53 and vice versa.

The movement means 54 have a grip element 55 for gripping the bottles 2, of the type of one or more suction-cups, which is mounted on a series of sliding actuators 56 that make it mobile between the auxiliary segment 38 of the forward moving line 29 and the sealing apparatus 53.

The sealing apparatus 53 has a plurality of attachment bodies 57 for gripping the bottles 2 once these have been released from the grip element 55.

The attachment bodies 57 consist, e.g., of a series of elongated and horizontal pintles, which can be fitted in the inner cavities of the hollow bodies 4 through the openings 7 of the bottles 2.

The sealing apparatus 53 comprises placing means for placing the bottles 2 against a locator plate 58.

These placing means consist of an actuator device 59 that permits moving the attachment bodies 57 along a vertical direction closer to and away from the locator plate 58.

Over the locator plate 58, heating means 60 are located, which move vertically to be positioned in contact with the straps 11 of the bottles 2 and apply the sealing points 17 and 18.

Such heating means, in detail, are defined by a hot punch, suitable for crushing the straps 11 of the bottles 2 against the locator plate 58.

Figure 12:
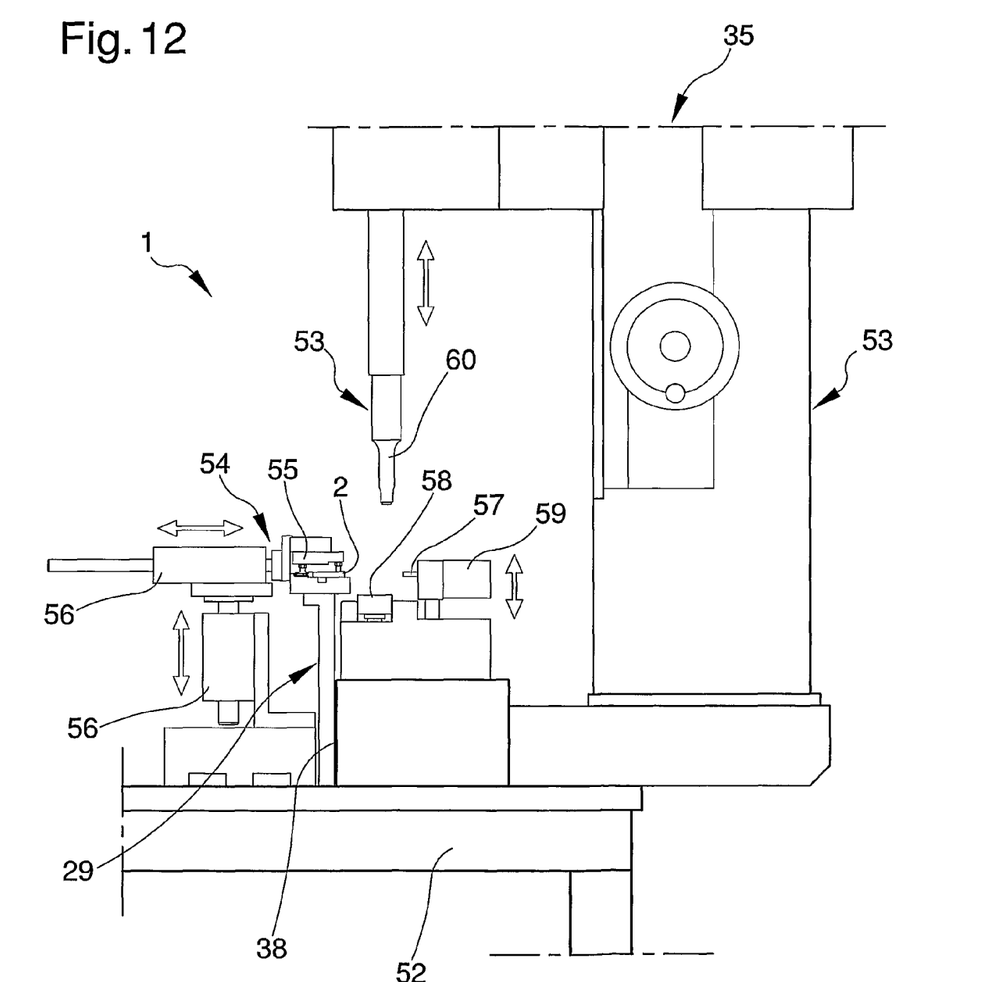
FIGS. 12 to 14 show, in a sequence of side raised views, the operation of the blockage station contemplated by the system according to the invention.
Figure 13:
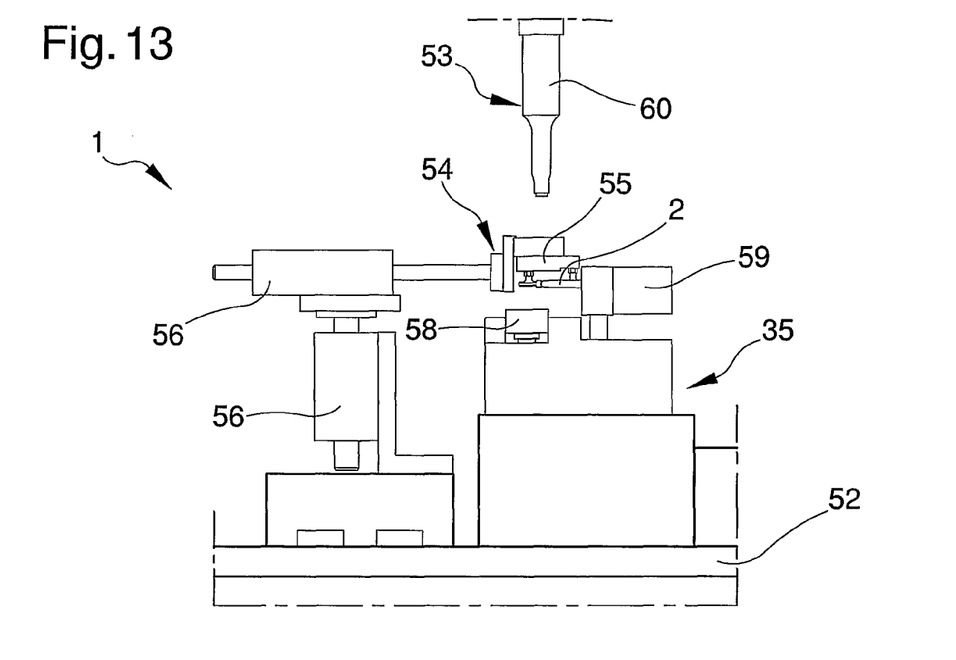

In point of fact, the bottles 2 coming from the coupling station 34, are conveyed from the guide rail 30 to the auxiliary segment 38 of the forward moving line 29 by means of the shuttle 39, and from here (FIG. 12) they are picked up by the grip element 55 and placed on the pintles 57 (FIG. 13).

Figure 14:
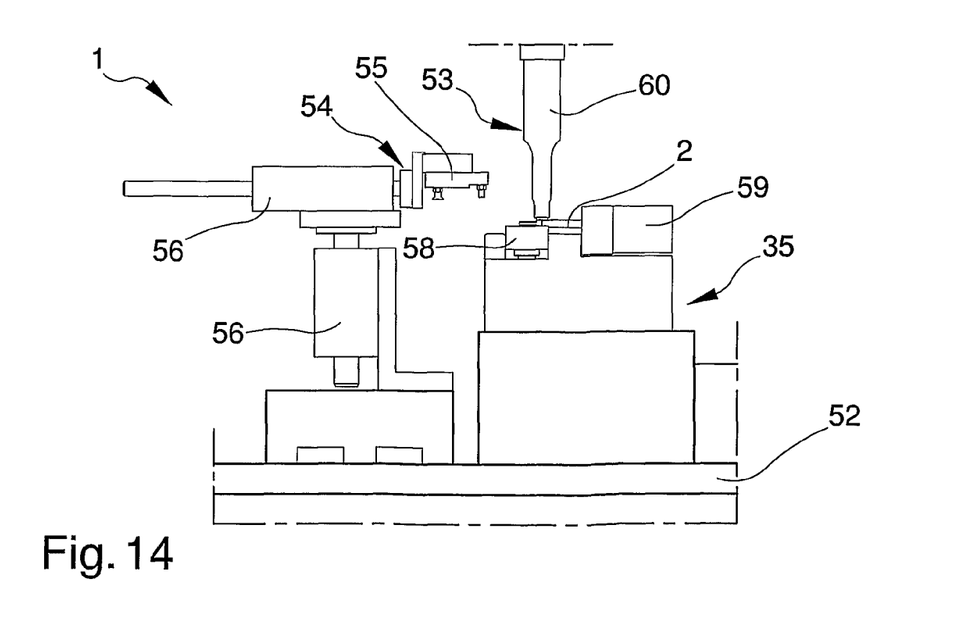

After the pintles 57, first, and the hot punch 60, next, have dropped, the sealing points 17 and 18 are applied to the straps 11 (FIG. 14).

Repeating the movement of the hot punch 60, of the pintles 57 and of the grip element 55 in reverse, the bottles 2 can be returned to the auxiliary segment 38 of the forward moving line 29 to be conveyed to a control station 36, suitable for checking the coupling seal between the small pins 10 and the mouths 5 of the bottles 2, and, finally, to a packaging station 37.

With reference to the preferred, but not only embodiment, of the system 1 as described and illustrated, the procedure for manufacturing bottles containing fluids, particularly cosmetic, medical, pharmaceutical products or the like, comprises the following steps:

forming of the bottles 2 by the injection moulding of plastic material in fluid state, so that, during forming, the closing means 8 are arranged with the small pins 10 substantially transversal, and in particular at right angles, to the direction of coupling to the mouths 5;

coupling the shutter means 10 to the mouths 5, by turning the closing means 8 with respect to the hollow bodies 4 until the small pins 10 are aligned with the mouths 5 and moving the closing means 8 close to the hollow bodies 4 until the small pins 10 are associated with the mouths 5;

fastening by sealing the straps 11 of the bottles 2 in the closing configuration of the mouths 5, the fastened straps 11 being suitable to act as a guarantee seal.

It has in point of fact being ascertained how the described invention achieves the proposed objects.

The invention thus conceived is susceptible to numerous modifications and variations, all of which falling within the scope of the inventive concept.

Furthermore all the details can be replaced with others that are technically equivalent.

In practice, the materials used, as well as the contingent shapes and dimensions, may be any according to requirements without because of this moving outside the protection scope of the following claims.

The invention claimed is:

1. A bottle for containing fluids, comprising:
   at least a hollow body having at least a dispensing mouth;
   a removable closing device for closing said mouth having a shutter pin insertable into the mouth; and
   a connector placed in between said closing device and said hollow body and suitable for permitting reciprocal movement between said closing device and said hollow body, said hollow body, said closing device and said connector being made in a single body,
   said bottle being configured to have at least three operating configurations including
      a) a first operating configuration in which said shutter pin is arranged substantially transversal to a direction of coupling to said mouth,
      b) a second operating configuration in which said shutter pin is arranged above the mouth and the shutter pin as substantially aligned with a direction of coupling of the mouth, and
      c) a third operating configuration which is a closing configuration of said mouth wherein the shutter pin is inserted inside the mouth,
   wherein said connector comprises at least a strap configured to move longitudinally and that extends from said hollow body to said closing device and has a first segment with weakened section, suitable for allowing the rotation of said closing device between the first operating configuration and the second operating configuration, and
   wherein said strap further comprises at least a second segment with weakened section, suitable for allowing the bending of the strap itself in a horizontal direction between said second operating configuration and the third operating configuration.

2. The bottle according to claim 1, wherein said strap comprises at least a first portion which is superimposable with said closing device during switch from said first operating configuration to said second operating configuration.

3. The bottle according to claim 1, wherein said strap comprises at least a second and a third portions which are superimposable the one on the other during switch from said second operating configuration to the closing configuration of said mouth.

4. The bottle according to claim 1, further comprising a lock for said connector in the closing configuration of said mouth, the connector locked by said lock being suitable to act as a guarantee seal.

5. The bottle according to claim 4, wherein said strap comprises at least a first portion which is superimposable with said closing device during switch from said first operating configuration to said second operating configuration and wherein said lock comprises at least a first sealing point of said first portion of the strap and of said closing device superimposed the one on the other.

6. The bottle according to claim 4, wherein said strap comprises at least a second and a third portions which are superimposable the one on the other during switch from said second operating configuration to the closing configuration of said mouth and wherein said lock comprises at least a second sealing point of said second and third portions of the strap superimposed the one on the other.

7. The bottle according to claim 1, wherein said connector comprises at least two of said straps.

8. The bottle according to claim 7, wherein said straps are arranged from parts diametrically opposite a neck of said hollow body.

9. The bottle according to claim 1, further comprising at least a weakened temporary connection segment with another bottle arranged adjacent.

10. A bottle for containing fluids, comprising:
at least a hollow body having at least a dispensing mouth;
a removable closing device for closing said mouth having a shutter pin insertable into the mouth; and
a connector placed in between said closing device and said hollow body and suitable for permitting reciprocal movement between said closing device and said hollow body, said hollow body, said closing device and said connector being made in a single body,
said bottle being configured to have at least three operating configurations including
  a) a first operating configuration in which said shutter pin is arranged substantially transversal to a direction of coupling to said mouth,
  b) a second operating configuration in which said shutter pin is arranged above the mouth and the shutter pin as substantially aligned with a direction of coupling of the mouth, and
  c) a third operating configuration which is a closing configuration of said mouth wherein the shutter pin is inserted inside the mouth,
wherein said connector comprises at least a strap configured to move longitudinally and that extends from said hollow body to said closing device and has a first segment with weakened section, suitable for allowing the rotation of said closing device between the first operating configuration and the second operating configuration, and wherein said strap comprises at least a second segment with a weakened section, suitable for allowing the bending of the strap itself between said second operating configuration and the closing configuration of said mouth wherein the shutter pin is inserted inside the mouth; and
wherein said strap comprises at least a first portion which is superimposable with said closing device during a switch from said first operating configuration to said second operating configuration; and
wherein said strap comprises at least a second portion and a third portion which are superimposable the one on the other during a switch from said second operating configuration to the closing configuration of said mouth.

11. The bottle according to claim 1, wherein the closing device has a segment and the strap includes a second portion and a third portion separated by and attached to the second segment with weakened section, and the segment of the closing device bends transverse to an axis of the bottle while the second portion and the third portion bend with the axis of the bottle.

12. The bottle according to claim 10, wherein the closing device has a segment, and the segment of the closing device bends transverse to an axis of the bottle while the second portion and the third portion bend with the axis of the bottle.

* * * * *

UNITED STATES PATENT AND TRADEMARK OFFICE
CERTIFICATE OF CORRECTION

PATENT NO.        : 8,672,157 B2
APPLICATION NO. : 12/450352
DATED             : March 18, 2014
INVENTOR(S)       : Antonio Fontana It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 853 days.

Signed and Sealed this

Twenty-ninth Day of September, 2015

Michelle K. Lee
*Director of the United States Patent and Trademark Office*